US010209076B1

(12) United States Patent
McNamara et al.

(10) Patent No.: US 10,209,076 B1
(45) Date of Patent: Feb. 19, 2019

(54) AIR DATA, ATTITUDE AND HEADING REFERENCE SYSTEM (ADAHRS) REPLACEMENT ARCHITECTURE

(71) Applicant: Rockwell Collins, Inc., Cedar Rapids, IA (US)

(72) Inventors: Jeffrey B. McNamara, West Melbourne, FL (US); James H. Doty, Cedar Rapids, IA (US); Vladislav Gavrilets, McLean, VA (US); Jesse W. Oltrogge, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 141 days.

(21) Appl. No.: 15/473,366

(22) Filed: Mar. 29, 2017

(51) Int. Cl.
*G01C 21/16* (2006.01)
*G08G 5/00* (2006.01)
*B64D 43/00* (2006.01)

(52) U.S. Cl.
CPC .......... *G01C 21/165* (2013.01); *B64D 43/00* (2013.01); *G08G 5/0047* (2013.01)

(58) Field of Classification Search
CPC ..... G01C 21/165; B64D 43/00; G08G 5/0047
See application file for complete search history.

(56) References Cited

U.S. PATENT DOCUMENTS

| | | | |
|---|---|---|---|
| 6,697,736 B2* | 2/2004 | Lin | G01C 21/165 342/357.3 |
| 8,237,609 B2 | 8/2012 | Talbot et al. | |
| 2016/0107761 A1 | 4/2016 | Ahlbrecht et al. | |
| 2017/0219351 A1* | 8/2017 | Hamilton | G01S 19/14 |

* cited by examiner

*Primary Examiner* — Mary Cheung
(74) *Attorney, Agent, or Firm* — Angel N. Gerdzhikov; Donna P. Suchy; Daniel M. Barbieri

(57) ABSTRACT

Systems and a related method for internally monitored navigation replace one or more inertial reference units (IRU) of an aircraft navigation system with GNSS-assisted multi-mode receivers (MMR) including dual-antenna receivers. Each MMR may validate inertial position data generated by a remaining IRU by detecting drift errors in the inertial position data or latent faults in the IRU. The system may include, in place of one or more IRUs, attitude heading and reference systems (AHRS) incorporating lower-grade high-performance inertial sensors. Internal monitoring of the remaining IRUs or the inertial position data generated thereby may alternatively be carried out by the AHRS. Based on internal monitoring by the MMRs and/or AHRS, user display and flight control systems of an aircraft can exclude a faulty IRU, preventing the use of position solutions incorporating erroneous inertial data.

20 Claims, 6 Drawing Sheets

AIR DATA, ATTITUDE AND HEADING REFERENCE SYSTEM (ADAHRS) REPLACEMENT ARCHITECTURE

CROSS-REFERENCE TO RELATED APPLICATIONS

This application relates to the following applications concurrently filed herewith and each incorporated herein by these references in their entirety: MULTI-MODE RECEIVER (MMR) BASED INERTIAL INTEGRATION by Jeffrey B. McNamara, James H. Doty, Vladislav Gavrilets, Gilles Tatham, and Jesse W. Oltrogge, having U.S. patent application Ser. No. 15/473,406.

BACKGROUND

A common approach to providing high-integrity coasting of position and velocity data after loss of a global navigation satellite system (GNSS) position signal in space is to employ a triple inertial reference unit (IRU; also inertial navigation unit (INU) installation whereby each of three IRUs individually produces an accurate hybrid GNSS inertial position solution. However, each IRU may have a latent sensor error, the result of which may be rapid growth in position error after loss of GNSS data. A triple-IRU installation may detect these latent errors, or faults, by voting out the "bad" IRU (e.g., an outlier).

However, cost pressures on original equipment manufacturers (OEMs) are driving the reduction or elimination of expensive or redundant navigation components such as IRUs. Further, changes in GNSS signaling and the regulatory environment will drive newer, more flexible architectures that can accommodate multiple frequencies and multiple satellite constellations. One approach is to replace one or two IRUs of the triple-IRU installation with a lower-cost option such as a GNSS-aided attitude and heading reference system (AHRS). However, such GNSS-aided AHRS are associated with lower-performance inertial sensors and consequently may not be able to "coast" position for more than a few seconds after the loss of GNSS data. As a result, the installation may have too few position solutions to vote out an IRU with a latent fault, as described above.

SUMMARY

In one aspect, embodiments of the inventive concepts disclosed herein are directed to a navigation system incorporating multi-mode receivers (MMR) with internal monitoring. The system may be an aircraft-based system including inertial reference units (IRU) including navigation-grade inertial sensors, or inertial measurement units (IMU), for determining inertially referenced position data of the aircraft and processors for combining the inertial position data with georeferenced position data to generate an integrated position solution (e.g., a position/velocity/time (PVT) solution) for use by display and flight control systems aboard the aircraft. The system may include MMRs incorporating navigation receivers for receiving satellite-based navigation signals and processors for determining the georeferenced position data of the aircraft based on the received signals. The MMR processors may receive the inertial position data from the IRUs and validate the IRUs (or their position data) by detecting drift errors in the inertial position data. The system may include an AHRS incorporating lower-grade inertial sensors for determining alternative position data of the aircraft and processors for determining an alternative integrated position solution for use by the aircraft display and flight control systems based on the alternative position data, the georeferenced position data, and the inertial position data from the IRUs.

In a further aspect, embodiments of the inventive concepts disclosed herein are directed to a navigation system incorporating an attitude and heading reference system (AHRS) with internal monitoring. The system may be an aircraft-based system including inertial reference units (IRU) including navigation-grade inertial sensors, or inertial measurement units (IMU), for determining inertially referenced position data of the aircraft and processors for combining the inertial position data with georeferenced position data to generate an integrated position solution (e.g., a position/velocity/time (PVT) solution) for use by display and flight control systems aboard the aircraft. The system may include multi-mode receivers (MMR) including navigation receivers for receiving satellite-based navigation signals and processors for determining the georeferenced position data of the aircraft based on the received signals. The MMR processors may receive the inertial position data from the IRUs and forward the inertial position data to the aircraft display or flight control systems. The system may include an AHRS incorporating lower-grade inertial sensors for determining alternative position data of the aircraft and processors for determining an alternative integrated position solution for use by the aircraft display and flight control systems based on the alternative position data, the georeferenced position data, and the inertial position data from the IRUs. The AHRS processors may validate the IRUs (or their position data) by detecting drift errors in the inertial position data In a still further aspect, embodiments of the inventive concepts disclosed herein are directed to a method for internally monitored navigation. The method may include receiving inertial position data (e.g., of an aircraft) from inertial reference units (IRU) and forwarding the inertial position data to MMRs or an AHRS. The method may include receiving "coasted" alternative inertial position data from the AHRS. The method may include validating, via either the MMRs or the AHRS, the IRUs or their inertial position data by detecting drift errors of the IRUs. The method may include generating an integrated position solution based on the georeferenced position data provided by the MMRs and validated inertial position data. The method may include forwarding the integrated position solution to the at least one user system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
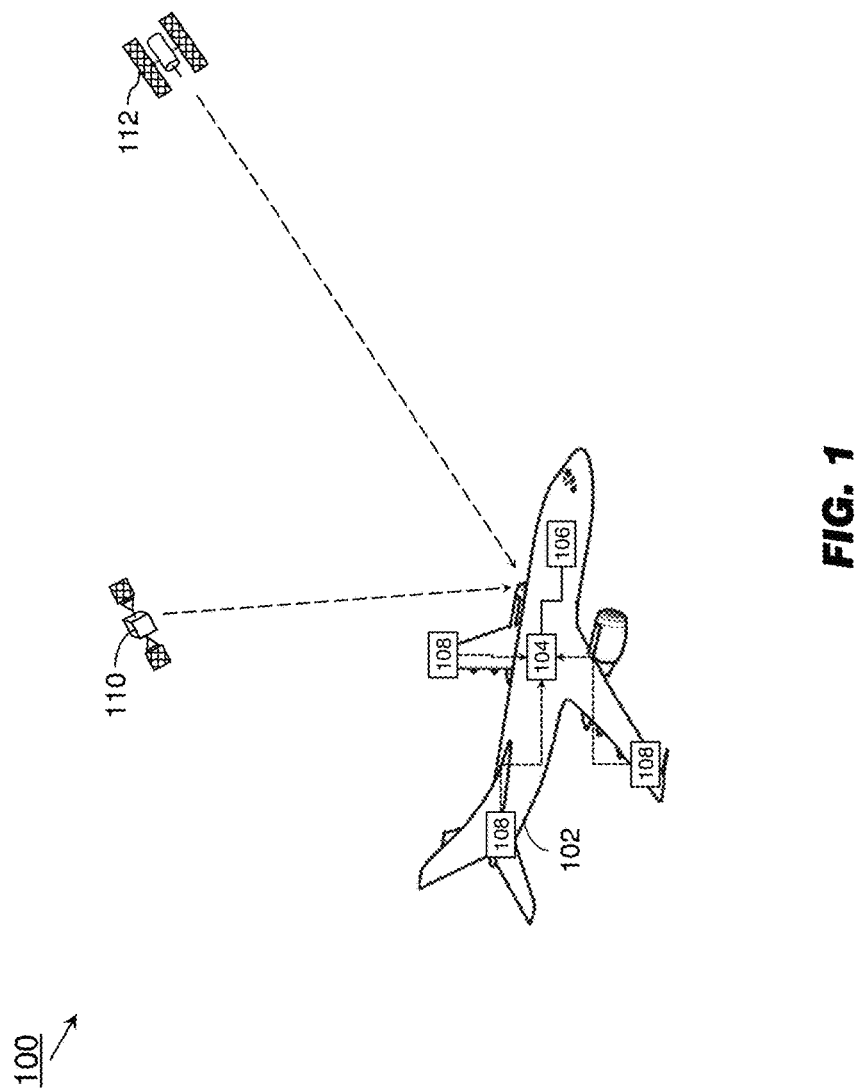
FIG. 1 is a diagrammatic illustration of an exemplary embodiment of a navigation system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for internal monitoring of a navigation system. In some embodiments, a conventional triple-IRU (or triple-ADIRU) navigation system may be made more cost-effective by replacing either one or two navigation-grade IRUs with attitude and heading reference systems (AHRS) incorporating lower-grade inertial sensors. By providing internal monitoring via multi-mode global navigation satellite system (GNSS) receivers or GNSS-assisted AHRS, the navigation system provide high integrity position solutions while detecting latent faults in an IRU and preventing display and flight control systems from incorporating faulty data.

Referring now to FIG. 1, an exemplary embodiment of a navigation system 100 according to embodiments of the inventive concepts herein may be embodied aboard an aircraft 102 and include a combination of inertial reference units 104 (IRU), global navigation satellite system (GNSS) enabled receivers 106, and air data sensors 108. For example, the GNSS-enabled receivers 106 may determine a georeferenced position of the aircraft 102 based on positioning signals received from navigational satellites 110, 112. The GNSS-enabled receivers 106 may be dual-antenna receivers incorporated into multi-mode receivers (MMR) including onboard processors for determining high integrity georeferenced position solutions. The navigational satellites 110, 112 may include components of diverse constellations, e.g., GPS, GLONASS, Compass, Beidou, Galileo, and transmitting in diverse signal formats. The IRU 104 may incorporate navigation-grade inertial measurement units (IMU) and inertial sensors (e.g., accelerometers, gyrometers, compasses, magnetometers) and processors for determining inertial (e.g., platform-referenced) position and velocity data of the aircraft 102. This "pure" inertial position data may be combined with georeferenced position data from the GNSS-enabled receivers 106 to generate high-integrity hybrid position solutions. Hybrid position solutions may include "coasted" solutions based primarily on inertial position data, in areas where GNSS signal reception may be unreliable or unavailable. Air-data sensors 108 may include onboard sensor systems, e.g., pitot-static systems, angle of attack (AoA) sensors, and wing-mounted total air temperature (TAT) sensors, providing additional real-time positional information to the IRUs 104 via air data modules (ADM). Implementations of the system 100 may replace one or more navigation-grade IRUs 104 (a conventional configuration may incorporate three IRUs: a main IRU dedicated to the pilot and co-pilot and a backup IRU should either main IRU fail) with a lower-cost but high-performance IMU such as an attitude and heading reference system (AHRS), an air data AHRS (ADAHRS), or a microelectromechanical (MEMS) AHRS/ADAHRS.

Figure 2:
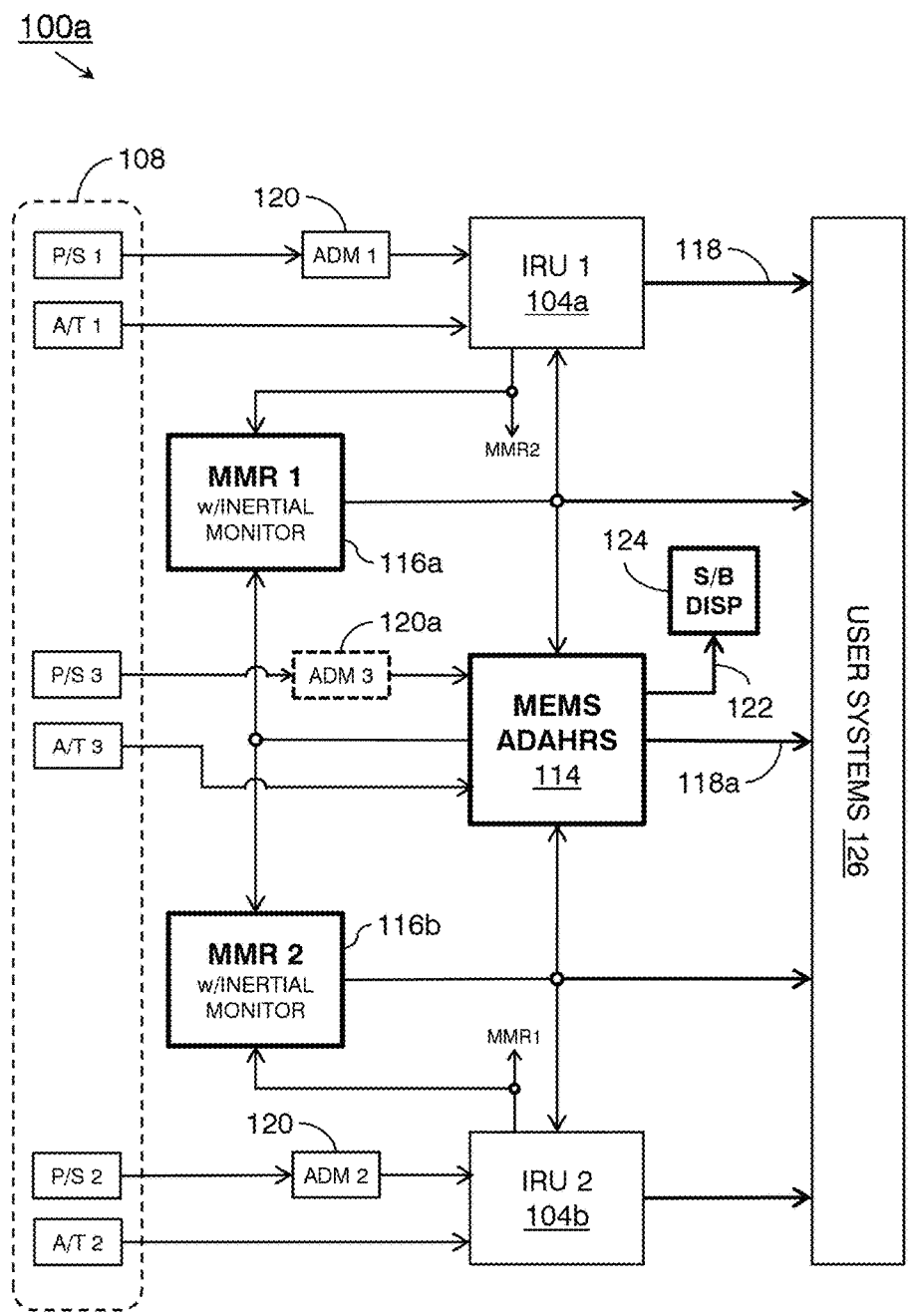
FIG. 2 is a diagrammatic illustration of the navigation system of FIG. 1 incorporating multi-mode receivers (MMR) with internal monitoring.

Referring now to FIG. 2, the navigation system 100a may be implemented and may function similarly to the navigation system 100 of FIG. 1, except that the navigation system 100a may incorporate two IRUs 104a-b, a MEMS ADAHRS 114 (replacing a third IRU), and two GNSS-enabled MMRs 116a-b. The MEMS ADAHRS 114 may incorporate lower-grade high-performance inertial sensors (e.g., compasses, magnetometers, accelerometers) as opposed to the navigation-grade sensors of the IRUs 104a-b. Each IRU 104a-b may integrate inertial position data (e.g., position, velocity, acceleration, heading, rotational orientation, attitude) from its own inertial sensors with georeferenced global navigation satellite system (GNSS) position data received from the MMRs 116a-b to generate primary integrated position solutions (118) wherein, for example, the inertial position data may compensate for "gaps" where satellite-based signals are unavailable. For example, if one or more IRUs 104a-b is an air data IRU (ADIRU), the inertial position data may include air data collected by processors of an ADM 120 from onboard air data sensors 108. The MEMS ADAHRS 114 may generate a primary integrated position solution (118a) incorporating inertial position data received from the IRUs 104a-b via the MMRs 116a-b and georeferenced position data from the MMRs 116a-b. In some embodiments, the MMRs 116a-b may provide air data from the ADM 120 to the MEMS ADAHRS 114; in some embodiments, the MEMS ADAHRS 114 may be an AHRS without access to air data. The MEMS ADAHRS 114 may generate a standby solution 122 (e.g., pure inertial solution) based on its own inertial data and secondary air data from a dissimilar ADM 120a, feeding the standby solution to a standby display 124 (e.g., for use in the event either IRU 104a-b fails). The standby display 124 may replace an integrated standby instrument system (ISIS) associated with the conventional triple-IRU configuration.

Each IRU 104a-b may provide "coasted" hybrid position data (e.g., position, velocity, acceleration, attitude) if satellite-based GNSS position data is not available. However, each IRU 104a-b may be subject to latent faults or drift errors (whereby the sensed inertial position data deviates from the true inertial position solution) which may accumulate over time if not corrected. A conventional three-IRU system may detect and respond to drift error by "voting out" an IRU generating a position solution deviant from that of its two counterparts, indicating inherent drift error. As the system 100 incorporates two IRUs 104a-b and the MEMS ADAHRS 114, the MMRs 116a-b may detect latent faults in either IRU (e.g., before entering a critical approach phase) via integration and monitoring functions, flagging the faulty IRU so that the MEMS ADAHRS 114 or other user systems 126 of the aircraft (102, FIG. 1) (e.g., display systems, flight management systems (FMS), flight control systems, fly-by-wire (FBW) control systems) exclude the faulty IRU and its inertial position data, using validated position data from the remaining IRU (although this may affect the overall RNP of the system 100).

By way of a non-limiting example, each MMR 116a-b and the MEMS ADAHRS 114 (via the MMRs) may receive pure inertial position data from each IRU 104a-b; each IRU 104a-b may additionally pass its pure inertial data along to the user systems 126. Each MMR 116a-b may individually combine the pure inertial data with georeferenced GNSS data to generate a series of hybrid position solutions, estimating errors in the inertial data based on the series of hybrid solutions and validating the inertial data and/or its associated IRU 104a-b, e.g., when the observed errors do not accumulate or exceed predicted bounds. If, for example, the IRU 104a is validated and the IRU 104b is faulty or determined to have "failed" due to excessive drift error, the MMRs 116a-b may pass along to the user systems 126 and the MEMS ADAHRS 114 only the pure inertial data from the validated IRU 104a. Alternatively, the user systems 126 may receive primary integrated position solutions (118) from both IRUs 104a-b, excluding any position solutions originating from an IRU 104b flagged as faulty by the MMRs 116a-b.

Figure 3:
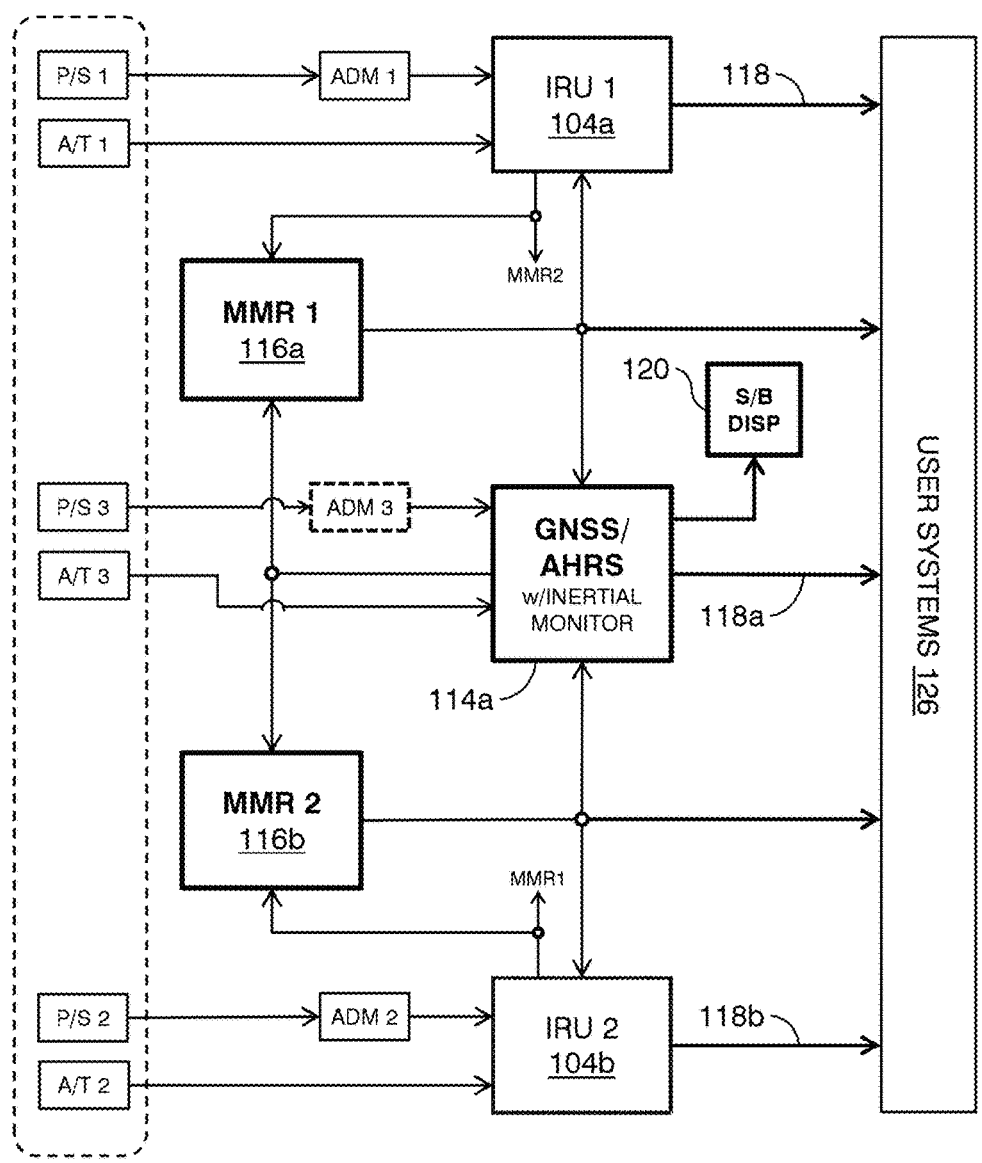
FIG. 3 is a diagrammatic illustration of the navigation system of FIG. 2 incorporating an attitude and heading reference system (AHRS) with internal monitoring.

Referring now to FIG. 3, the navigation system 100b may be implemented and may function similarly to the navigation system 100a of FIG. 2, except that the navigation system 100a may provide internal monitoring of the IRUs 104a-b via a GNSS-enabled AHRS 114a. The GNSS-enabled AHRS 114a may be an air-data AHRS (ADARHS) or a MEMS ADAHRS (114, FIG. 1). Providing internal monitoring via the GNSS-enabled AHRS 114a rather than the MMRs 116a-b may reduce necessary modifications to the MMRs. For example, the GNSS-enabled AHRS 114a may receive georeferenced position data from the one or more MMRs 116a-b and integrate the georeferenced position data with inertial data from each IRU 104a-b to generate primary integrated position solutions (118a). Based on the primary integrated position solutions 118, 118a-b generated by each IRU 104a-b and by the GNSS-enabled AHRS 114a, the GNSS-enabled AHRS may detect drift errors in the inertial data or a latent fault in the IRU 104b. The GNSS-enabled AHRS 114a may indicate to the user systems 126 that any primary integrated position solution (118b) or inertial position data originating at the IRU 104b is to be excluded.

Figure 4:
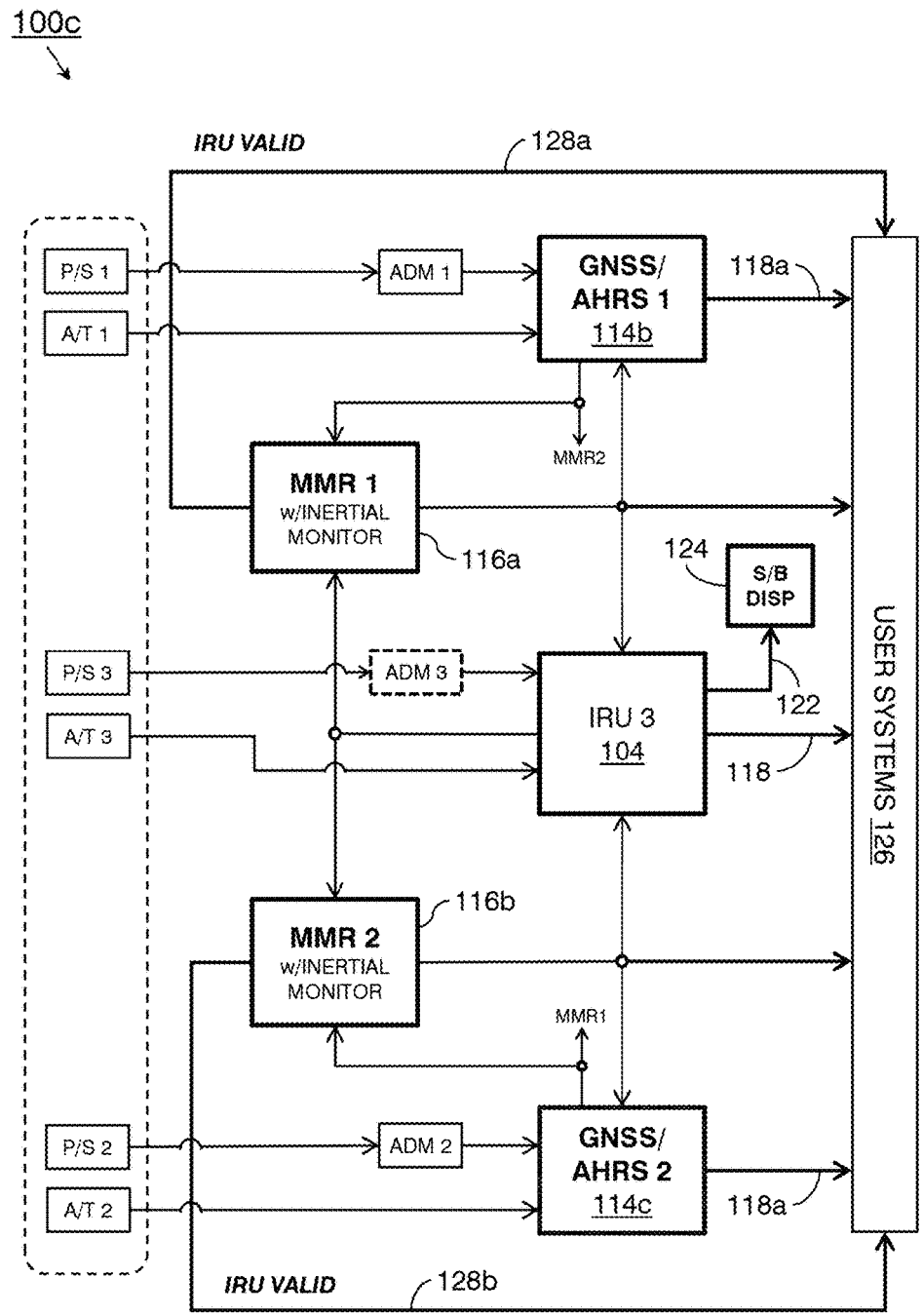
FIG. 4 is a diagrammatic illustration of the navigation system of FIG. 3 incorporating multi-mode receivers (MMR) with internal monitoring.

Referring to FIG. 4, the navigation system 100c may be implemented and may function similarly to the navigation system 100b of FIG. 3, except that the navigation system 100c may incorporate only a single IRU 104 (e.g., feeding a primary integrated position solution 118 to the user systems 126 and a standby pure inertial position solution (122) to the standby display 124) and two GNSS-enabled AHRS 114b-c (e.g., feeding primary integrated position solutions (118a) to the user systems 126) providing internal monitoring of the lone IRU 104 via the MMRs 116a-b. As the navigation system 100c incorporates only a single IRU 104, the system cannot resort to validated data from a second or backup IRU if the IRU 104 is determined to be faulty. Accordingly, the MMRs 116a-b may integrate inertial position data from the IRU 104 with georeferenced position data and make a determination (128a-b) that the IRU 104 is either valid or invalid, flagging the IRU 104 as either a) valid (approach-ready) or b) faulty for the user systems 126. In the latter case, the aircraft (102, FIG. 1) may be required to abort an approach procedure due to insufficiently accurate navigational data, as no valid IRU data would be available.

Figure 5A:
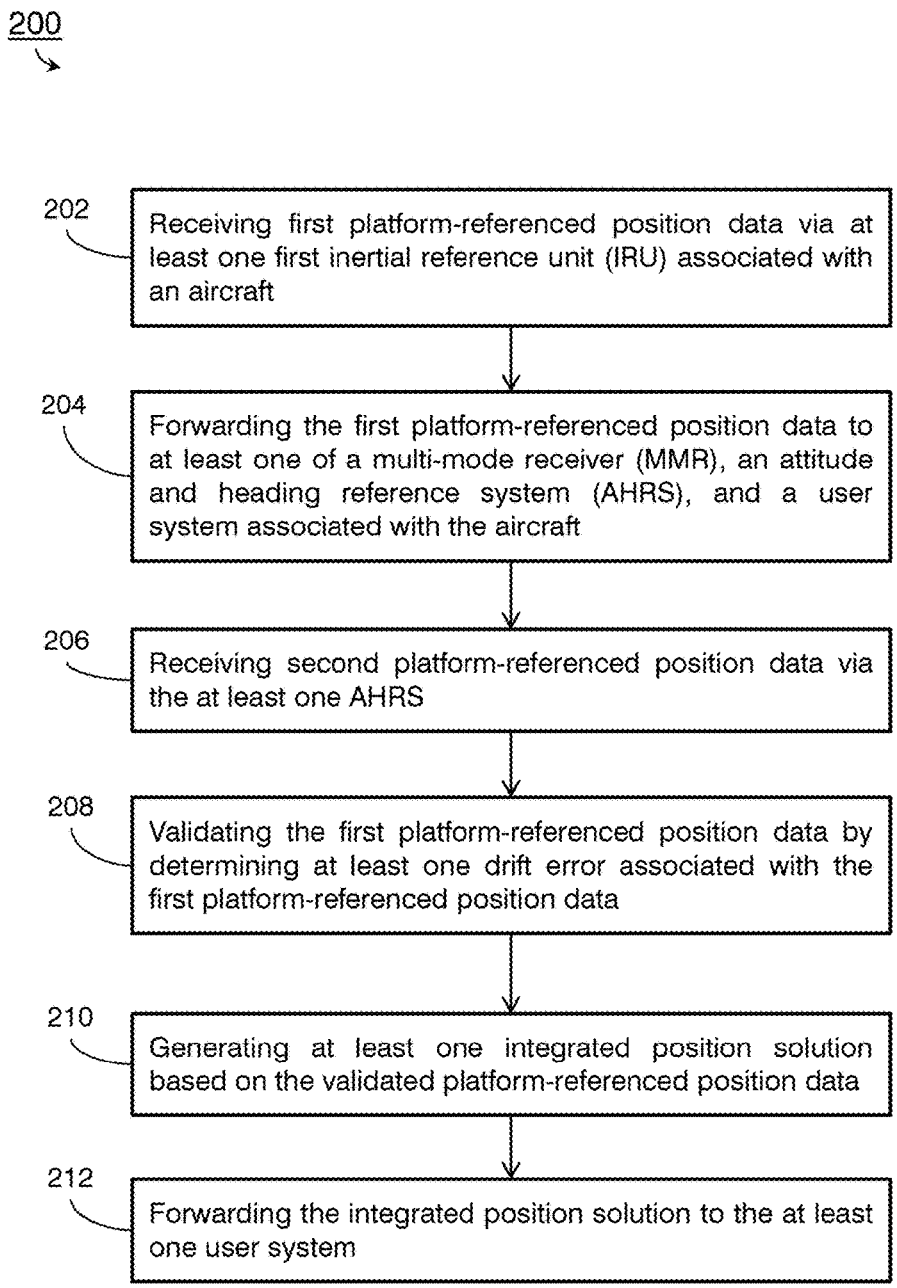
FIGS. 5A-5C illustrate an exemplary embodiment of a method for internally monitored navigation according to the inventive concepts disclosed herein.
Figure 5B:
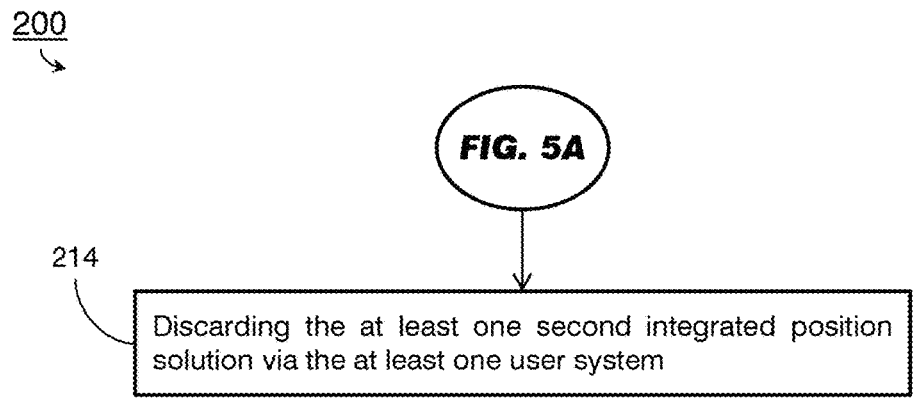
Figure 5C:
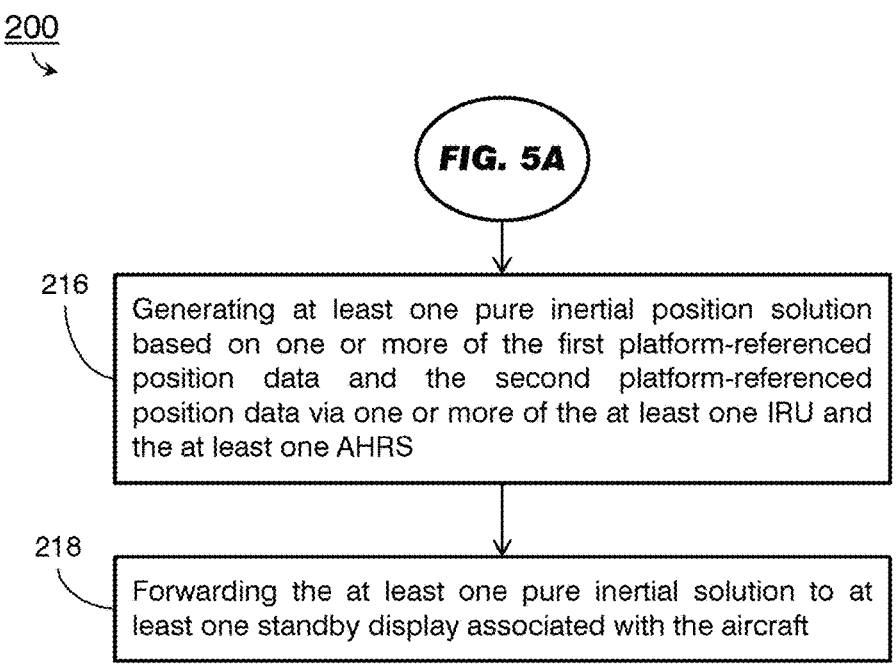

Referring now to FIGS. 5A through 5C, an exemplary embodiment of a method 200 for internally monitored navigation according to the inventive concepts disclosed herein may be implemented by the navigation system 100 in some embodiments, and may include one or more of the following steps.

Referring in particular to FIG. 5A, at a step 202, one or more IRUs (e.g., of an aircraft) generate pure inertial position data of the aircraft based on one or more primary inertial sensors.

At a step 204, the IRUs forward the pure inertial position data to one or more of a multi-mode receiver (MMR), an attitude heading and reference system (AHRS) or a user system (e.g., a display or flight control system) of the aircraft.

At a step 206, the AHRS generates secondary inertial position data of the aircraft based on one or more secondary inertial sensors.

At a step 208, the navigation system validates the inertial position data generated by the IRUs by determining drift errors in the inertial position data (or latent faults in the IRU). For example, either an MMR or AHRS, depending on the precise system configuration, may generate hybrid position solutions by integrating the inertial position data with georeferenced position data or secondary inertial data.

At a step 210, the MMR or AHRS may generate integrated position solutions based on inertial data from a validated IRU.

At a step 212, the MMR or AHRS may forward the integrated position solutions to the user systems, the integrated position solutions based either on validated inertial position data or non-validated inertial position data (e.g., from a known faulty IRU). Alternatively, the MMR may make a determination of the validity or non-validity of a lone IRU, forwarding the validity determinations to the user systems.

Referring in particular to FIG. 5B, the method 200 may include an additional step 214. At the step 214, the user systems may discard any integrated position solutions based on non-validated or faulty inertial position data.

Referring in particular to FIG. 5C, the method 200 may include additional steps 216 and 218. At the step 216, the IRU or the AHRS may generate pure inertial position solutions based on inertial position data and air data. For example, the AHRS may generate pure inertial position solutions based on secondary inertial sensor data and secondary air data received from a dissimilar air data module.

At the step 218, the IRU or the AHRS may forward the pure inertial position solutions to a standby display of the aircraft.

As will be appreciated from the above, systems and methods according to embodiments of the inventive concepts disclosed herein may enable more cost-effective navigation systems whereby one or more IRUs or ADIRUs are replaced by a less expensive but high-performance AHRS, while preserving the navigation system's ability to detect latent fault or drift error in a remaining IRU and prevent the display or flight control systems of an aircraft from incorporating faulty data into position solutions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A navigation system incorporating an attitude and heading reference system (AHRS), comprising:
at least one inertial reference unit (IRU) comprising:
at least one first inertial measurement unit (IMU) configured to determine first platform-referenced position data associated with an aircraft; and
at least one first processor configured to:
receive the first platform-referenced position data from the at least one first IMU;
receive georeferenced position data from at least one multi-mode receiver (MMR) associated with the aircraft;
generate at least one first integrated position solution based on one or more of the platform-referenced position data and the georeferenced position data; and
forward one or more of the first platform-referenced position data and the first integrated position solution to at least one user system associated with the aircraft;
the at least one MMR coupled to the at least one IRU and comprising:
at least one receiver configured to receive one or more satellite-based navigational signals; and
at least one second processor configured to:
determine the georeferenced position data based on the one or more satellite-based navigational signals;
receive the first platform-referenced position data from the at least one IRU;
validate one or more of the at least one IRU and the first platform-referenced position data by determining at least one drift error associated with the first platform-referenced position data; and
forward one or more of the at least one drift error and the validated first platform-referenced position data to the at least one user system;
at least one attitude and heading reference system (AHRS) coupled to the at least one MMR and comprising:
at least one second inertial measurement unit (IMU) configured to determine second platform-referenced position data associated with the aircraft;
at least one third processor configured to:
receive from the at least one MMR one or more of the georeferenced position data and the validated first platform-referenced position data;
generate at least one second integrated position solution based on one or more of the georeferenced position data and the validated first platform-referenced position data; and
forward the at least one second integrated position solution to the at least one user system.

2. The navigation system of claim 1, wherein the at least one user system is configured to discard the at least one first integrated position solution based on the at least one determined drift error.

3. The navigation system of claim 1, wherein the at least one user system includes at least one of a display system, a flight control (FC) system, a flight management system (FMS), and a fly-by-wire (FBW) system.

4. The navigation system of claim 1, wherein:
the at least one IRU includes:
at least one air-data IRU (ADIRU) further comprising a first air data module (ADM) configured to receive first air data from one or more of an air data sensor associated with the aircraft and an avionics component associated with the aircraft;
the at least one first processor is configured to:
receive the first air data from the at least one first ADM; and
generate the at least one first integrated position solution based on one or more of the platform-referenced position data, the first air data, and the georeferenced position data;
and
the at least one AHRS includes:

at least one air-data AHRS (ADAHRS) configured to receive second air data from one or more of the air data sensor and the avionics component; and the at least one third processor is configured to generate the at least one second integrated position solution based on one or more of the georeferenced position data, the validated first platform-referenced position data, the second platform-referenced position data, and the second air data.

5. The navigation system of claim 4, wherein the at least one third processor is configured to:
generate at least one first pure inertial position solution based on one or more of the second platform-referenced position data and the second air data; and
forward the at least one first pure inertial position solution to at least one standby display associated with the aircraft.

6. The navigation system of claim 4, wherein the at least one first processor is configured to:
generate at least one second pure inertial position solution based on one or more of the first platform-referenced position data and the second air data; and
forward the at least one second pure inertial position solution to at least one standby display associated with the aircraft.

7. The navigation system of claim 1, wherein:
the at least one first IMU includes a navigation-grade inertial sensor;
the at least one second IMU includes a magnetometer; and
the at least one AHRS includes a microelectromagnetic (MEMS) AHRS.

8. The navigation system of claim 1, wherein the at least one MMR is further configured to forward to the at least one user system at least one IRU validity status corresponding to the at least one IRU.

9. A navigation system incorporating an AHRS, comprising:
at least one IRU comprising:
at least one first IMU configured to determine first platform-referenced position data associated with an aircraft; and
at least one first processor configured to:
receive the first platform-referenced position data from the at least one first IMU;
receive georeferenced position data from at least one multi-mode receiver (MMR) associated with the aircraft;
generate at least one first integrated position solution based on one or more of the platform-referenced position data and the georeferenced position data; and
forward one or more of the first platform-referenced position data and the first integrated position solution to at least one user system associated with the aircraft;
the at least one MMR coupled to the at least one IRU and comprising:
at least one receiver configured to receive one or more satellite-based navigational signals; and
at least one second processor configured to:
determine the georeferenced position data based on the one or more satellite-based navigational signals;
receive the first platform-referenced position data from the at least one IRU; and
forward one or more of the georeferenced position data and the first platform-referenced data to the at least one user system;
and
the at least one AHRS coupled to the at least one MMR and comprising:
at least one second IMU configured to determine second platform-referenced position data associated with the aircraft; and
at least one third processor configured to:
receive from the at least one MMR one or more of the georeferenced position data and the first platform-referenced position data;
validate one or more of the at least one IRU and the first platform-referenced position data by determining at least one drift error associated with the first platform-referenced position data;
generate at least one second integrated position solution based on one or more of the georeferenced position data, the validated first platform-referenced position data, and the second platform-referenced position data;
generate at least one pure inertial position solution based on the second platform-referenced position data;
forward the at least one pure inertial position solution to at least one standby display associated with the aircraft; and
forward the at least one second integrated position solution to the at least one user system.

10. The navigation system of claim 9, wherein the at least one user system includes at least one of a display system, a flight control (FC) system, a flight management system (FMS), and a fly-by-wire (FBW) system.

11. The navigation system of claim 9, wherein the at least one user system is configured to discard the at least one first integrated position solution based on the at least one determined drift error.

12. The navigation system of claim 9, wherein:
the at least one IRU includes:
at least one air-data IRU (ADIRU) further comprising a first air data module (ADM) configured to receive first air data from one or more of an air data sensor associated with the aircraft and an avionics component associated with the aircraft;
the at least one first processor configured to:
receive the first air data from the at least one first ADM; and
generate the at least one first integrated position solution based on one or more of the platform-referenced position data, the first air data, and the georeferenced position data;
and
the at least one AHRS includes at least one air-data AHRS (ADAHRS) configured to receive second air data from one or more of the air data sensor and the avionics component; and
the at least one third processor is configured to generate the at least one second integrated position solution based on one or more of the georeferenced position data, the validated first platform-referenced position data, the second platform-referenced position data, and the second air data.

13. The navigation system of claim 12, wherein the at least one third processor is configured to generate the at least one pure inertial solution based on one or more of the second platform-referenced position data and the second air data.

14. The navigation system of claim 9, wherein:
the at least one first IMU includes a navigation-grade inertial sensor;
the at least one second IMU includes a magnetometer; and
the at least one AHRS includes a microelectromagnetic (MEMS) AHRS.

15. A method for inertially monitored navigation, comprising:
receiving first platform-referenced position data via at least one first inertial reference unit (IRU) associated with an aircraft;
forwarding the first platform-referenced position data to at least one of a multi-mode receiver (MMR), an attitude and heading reference system (AHRS), and a user system associated with the aircraft;
receiving second platform-referenced position data via the at least one AHRS;
validating the first platform-referenced position data by determining at least one drift error associated with the first platform-referenced position data;
generating at least one integrated position solution based on the validated platform-referenced position data; and
forwarding the integrated position solution to the at least one user system.

16. The method of claim 15, wherein validating the first platform-referenced position data by determining at least one drift error associated with the first platform-referenced position data includes:
validating the first platform-referenced position data by determining at least one drift error associated with the first platform-referenced position data via one or more of the at least one MMR and the at least one AHRS.

17. The method of claim 15, wherein validating the first platform-referenced position data by determining at least one drift error associated with the first platform-referenced position data includes:
generating at least one hybrid position solution based on one or more of the first platform-referenced position data and georeferenced position data.

18. The method of claim 15, wherein forwarding the integrated position solution to the at least one user system includes:
forwarding, via the at least one IRU, one or more of a first integrated position solution based on the validated first platform-referenced position data and a second integrated position solution based on the non-validated first platform-referenced position data to the at least one user system.

19. The method of claim 18, further comprising:
discarding the at least one second integrated position solution via the at least one user system.

20. The method of claim 15, further comprising:
generating at least one pure inertial position solution based on one or more of the first platform-referenced position data and the second platform-referenced position data via one or more of the at least one IRU and the at least one AHRS; and
forwarding the at least one pure inertial solution to at least one standby display associated with the aircraft.

* * * * *